(12) United States Patent
Naruse

(10) Patent No.: US 9,277,066 B2
(45) Date of Patent: Mar. 1, 2016

(54) COMMUNICATION SYSTEM, COMMUNICATION TERMINAL, CONTROL METHOD, AND STORAGE MEDIUM STORING PROGRAM

(71) Applicant: CANON KABUSHIKI KAISHA, Tokyo (JP)

(72) Inventor: Taketomo Naruse, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/304,376

(22) Filed: Jun. 13, 2014

(65) Prior Publication Data
US 2015/0002872 A1 Jan. 1, 2015

(30) Foreign Application Priority Data

Jun. 28, 2013 (JP) .................................. 2013-137486

(51) Int. Cl.
| | |
|---|---|
| *G06F 3/12* | (2006.01) |
| *H04N 1/00* | (2006.01) |
| *H04N 1/333* | (2006.01) |
| *H04N 21/41* | (2011.01) |
| *H04N 21/436* | (2011.01) |
| *H04N 21/4363* | (2011.01) |
| *H04N 21/442* | (2011.01) |
| *H04N 21/647* | (2011.01) |

(52) U.S. Cl.
CPC ....... *H04N 1/00217* (2013.01); *H04N 1/00307* (2013.01); *H04N 1/33323* (2013.01); *H04N 1/33369* (2013.01); *H04N 21/4126* (2013.01); *H04N 21/43615* (2013.01); *H04N 21/43637* (2013.01); *H04N 21/44227* (2013.01); *H04N 21/64707* (2013.01); *H04N 2201/006* (2013.01); *H04N 2201/0027* (2013.01); *H04N 2201/0039* (2013.01); *H04N 2201/0041* (2013.01); *H04N 2201/0044* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,468,173 | B2* | 6/2013 | Nakajima | G06F 12/1458 707/795 |
| 2009/0103124 | A1* | 4/2009 | Kimura | G06F 3/1204 358/1.15 |
| 2013/0229673 | A1* | 9/2013 | Nakayama | H04N 1/00127 358/1.13 |
| 2013/0229684 | A1* | 9/2013 | Yasuzaki | H04N 1/00127 358/1.15 |
| 2013/0229685 | A1* | 9/2013 | Naruse | G06F 3/1207 358/1.15 |
| 2013/0231051 | A1* | 9/2013 | Naruse | G06F 3/1204 455/41.2 |

(Continued)

FOREIGN PATENT DOCUMENTS

| | | |
|---|---|---|
| JP | 2007-166538 A | 6/2007 |
| JP | 2009-060526 A | 3/2009 |

*Primary Examiner* — Marcus T Riley
(74) *Attorney, Agent, or Firm* — Fitzpatrick, Cella, Harper & Scinto

(57) ABSTRACT

In a communication terminal, a transmission control unit transmits, by a first wireless communication method to the information processing apparatus, instruction for executing wireless communication by a second wireless communication method using communication information stored in the information processing apparatus. In an information processing apparatus, a storage unit stores the communication information. A communication unit executes wireless communication by the second wireless communication method using the communication information stored in the storage unit, in a case where the instruction is transmitted by the transmission control unit.

20 Claims, 14 Drawing Sheets

(56) References Cited

U.S. PATENT DOCUMENTS

2014/0043635 A1* 2/2014 Ozawa .............. H04N 1/00307
358/1.13

2014/0195585 A1* 7/2014 Mihara .................. H04L 67/10
709/201

2014/0355050 A1* 12/2014 Sakai .................... G06F 3/1204
358/1.15

* cited by examiner

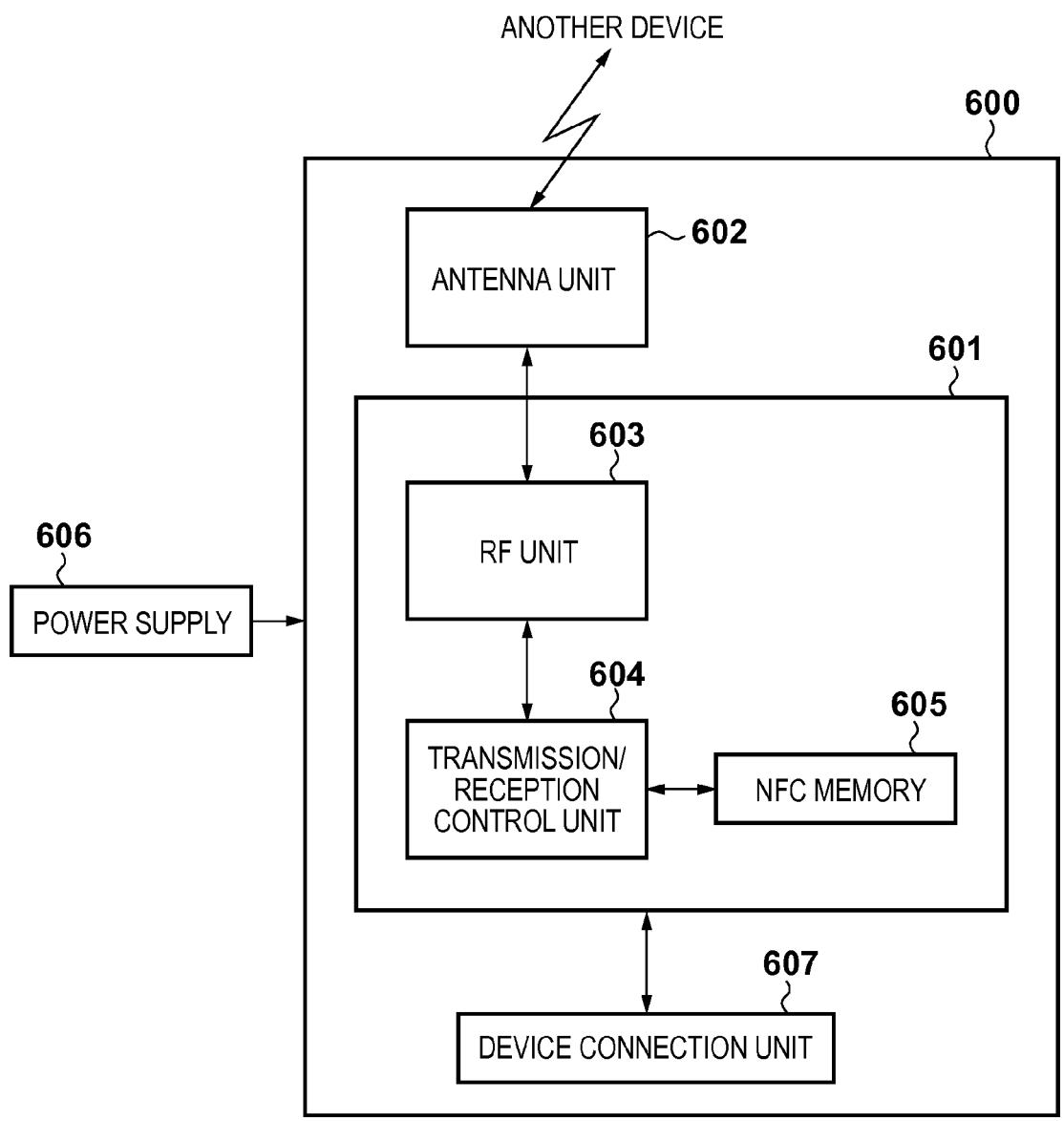

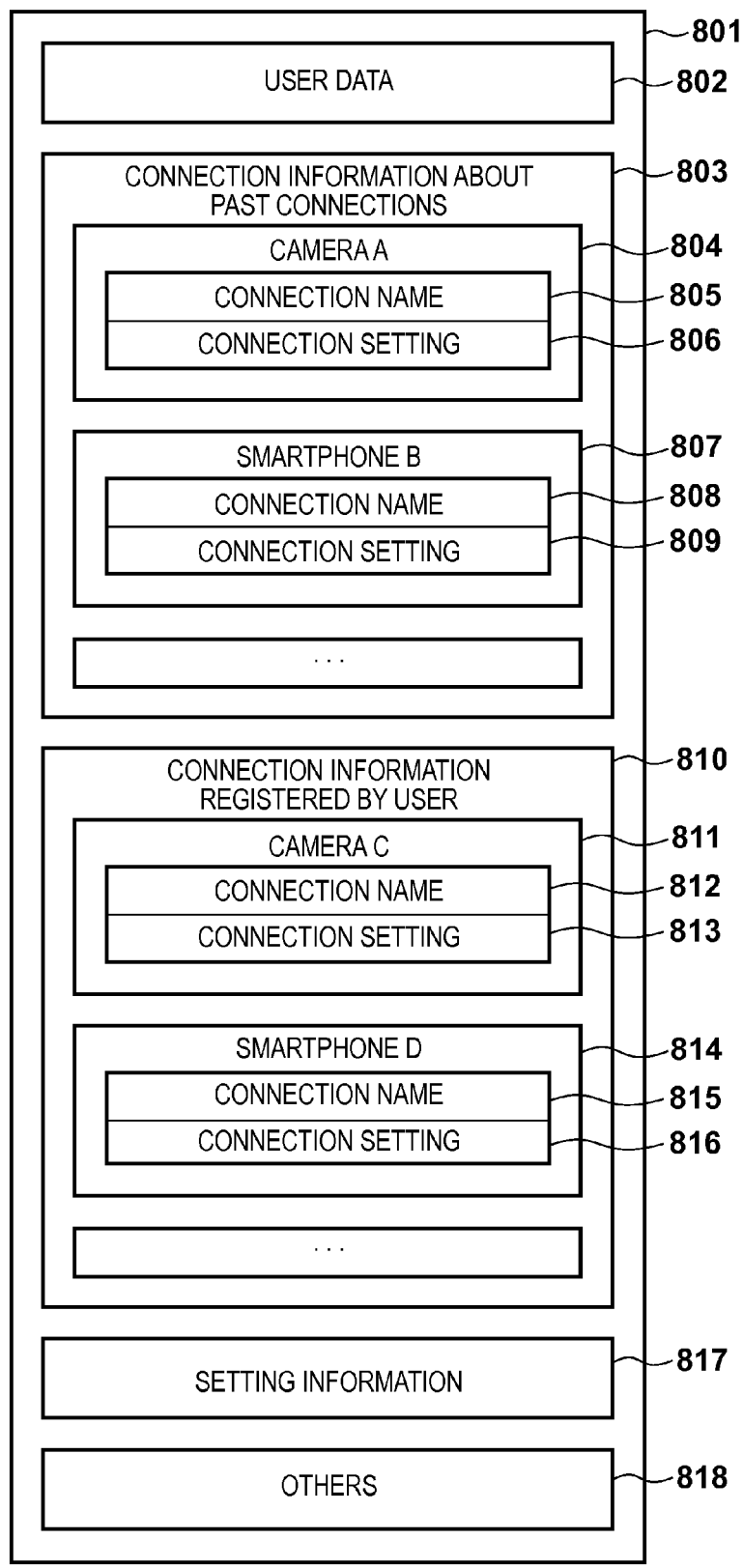

FIG. 9

| WPS AUTHENTICATION | BLUETOOTH AUTHENTICATION |
|---|---|
| SSID : abcdef<br>Encryption : AES<br>Auth Type : WPA2PSK<br>Network Key : 123456<br>MAC address : 11-AA-22-BB-33-CC | BD address<br>Hash C<br>Randomizer R |

901  902

F I G. 13
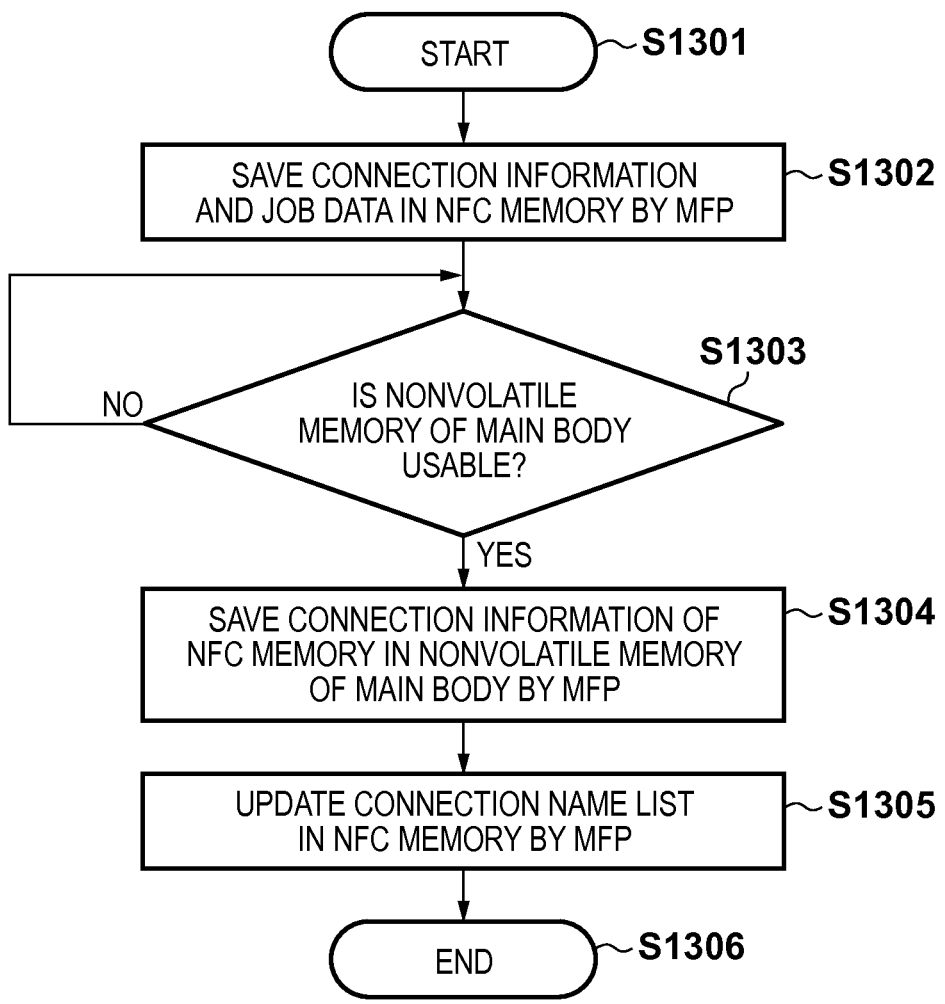

COMMUNICATION SYSTEM, COMMUNICATION TERMINAL, CONTROL METHOD, AND STORAGE MEDIUM STORING PROGRAM

BACKGROUND OF THE INVENTION

1. Field of the Invention

The present invention relates to a communication system, communication terminal, information processing apparatus, control method, and storage medium storing a program, capable of near field wireless communication.

2. Description of the Related Art

Recently, a mobile communication terminal apparatus is known to perform short distance wireless communication in addition to communication via a communication network. A partner communication apparatus in short distance wireless communication is, for example, a mobile communication terminal apparatus or MFP (Multi Function Printer), and transmits/receives image data and the like. At this time, short distance wireless communication is sometimes performed by two communication methods in order to implement efficient communication by taking account of the communication speed and operability. For example, pieces of information of a communication target apparatus necessary for the second short distance wireless communication method are transmitted/received by the first short distance wireless communication capable of reliably specifying a communication partner, and high-speed communication is performed by the second short distance wireless communication method using the pieces of information (Japanese Patent Laid-Open No. 2007-166538).

The first short distance wireless communication method is, for example, NFC (Near Field Communication), and the second short distance wireless communication method is, for example, Bluetooth® or a wireless LAN. Japanese Patent Laid-Open No. 2007-166538 proposes a printer which first transmits the communication method and cryptographic method of the next communication by NFC, then switches the communication, and prints by using the second communication method. The processing of performing pairing by the first short distance wireless communication method and then switching the communication to the second short distance wireless communication method is called a handover. Japanese Patent Laid-Open No. 2009-60526 discloses a technique of transmitting a BD address and link key in Bluetooth using an auxiliary communication unit such as a non-contact IC module, and then performing communication using Bluetooth.

However, security may be poor in the use of a method of saving, in a storage unit, the result of communication using an auxiliary communication unit such as a non-contact IC module, as disclosed in Japanese Patent Laid-Open No. 2009-60526. A memory accessory to a non-contact IC reader/writer is designed so that it can be used even upon power-off. This memory is vulnerable to piracy or alteration because it takes only a low-level security measure in comparison with a main memory capable of complicated CPU control. That is, since the non-contact IC module is used, this memory reacts to a read/write request from an arbitrary apparatus and allows an arbitrary user to access data saved in the storage unit. For example, when a malicious user accesses the storage unit by using a non-contact IC reader/writer mounted in a mobile phone, information about the BD address and link key in Bluetooth may be stolen.

SUMMARY OF THE INVENTION

An aspect of the present invention is to eliminate the above-mentioned problems with the conventional technology. The present invention provides a communication system, communication terminal, information processing apparatus, control method, and storage medium storing a program for enhancing the security of communication information.

The present invention in one aspect provides a communication system comprising an information processing apparatus and a communication terminal capable of wireless communication with the information processing apparatus, the communication terminal including: a transmission control unit configured to transmit, by a first wireless communication method to the information processing apparatus, instruction for executing wireless communication by a second wireless communication method using communication information stored in the information processing apparatus, and the information processing apparatus including: a storage unit configured to store the communication information; and a communication unit configured to execute wireless communication by the second wireless communication method using the communication information stored in the storage unit, in a case where the instruction is transmitted by the transmission control unit.

According to the present invention, the security of communication information can be enhanced.

Further features of the present invention will become apparent from the following description of exemplary embodiments with reference to the attached drawings.

BRIEF DESCRIPTION OF THE DRAWINGS

FIG. 6 is a block diagram showing the arrangement of an NFC unit;

FIG. 8 is a view showing the structure of the nonvolatile RAM of the MFP;

FIG. 9 is a view showing an example of connection information;

FIG. 13 is a flowchart when connection information transmitted from the mobile communication terminal apparatus is saved in the memory of the MFP.

DESCRIPTION OF THE EMBODIMENTS

Figure 1:
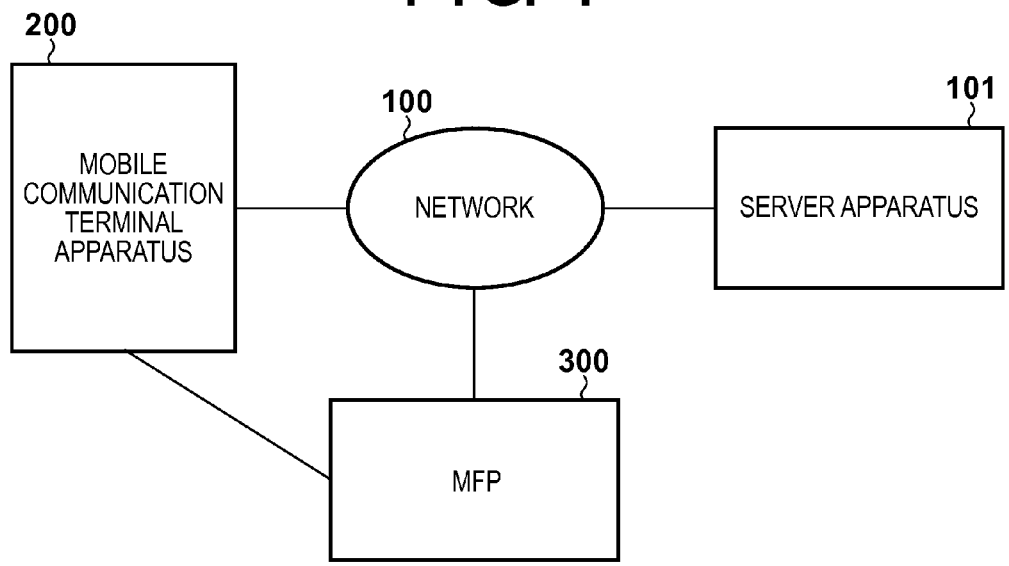
FIG. 1 is a block diagram showing the arrangement of a wireless communication system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

First Embodiment

The first embodiment will describe an example in which authentication is performed by low-speed communication using a near field wireless communication method, and then the communication is switched to high-speed wireless communication to transmit print data. For example, the first embodiment will explain a printing method using a handover technique of performing authentication by short distance wireless communication such as NFC (Near Field Communication), and taking over communication by another wireless communication method.

FIG. 1 is a block diagram showing the arrangement of a wireless communication system. A server apparatus 101, a mobile communication terminal apparatus 200 (mobile terminal), and a multi-function printer (MFP) 300 (information processing apparatus) are connected to each other via a network 100 serving as the center so that they can communicate with each other. The server apparatus 101 includes a storage unit for storing various data such as image data for printing, an image processing application, and a user ID. The mobile communication terminal apparatus 200 is an apparatus having at least two wireless communication methods different in authentication method and communication speed. The mobile communication terminal apparatus 200 suffices to be an apparatus capable of handling a file to be printed, such as a personal information terminal (for example, PDA (Personal Digital Assistant)), a mobile phone, or a digital camera. The MFP 300 has a reading function of optically reading an original set on a platen, and a printing function using a printing unit of an inkjet printing method or the like. In addition, the MFP 300 may have a FAX function and telephone function. The network 100 and server apparatus 101 are connected by a wired LAN so that they can communicate with each other. The network 100 and MFP 300 are connected by a wired LAN or wireless LAN (WLAN) so that they can communicate with each other. The network 100 and mobile communication terminal apparatus 200 are connected by the WLAN so that they can communicate with each other. Both the mobile communication terminal apparatus 200 and MFP 300 have a WLAN function, and can perform peer-to-peer (P2P) communication by mutual authentication.

Figure 2:
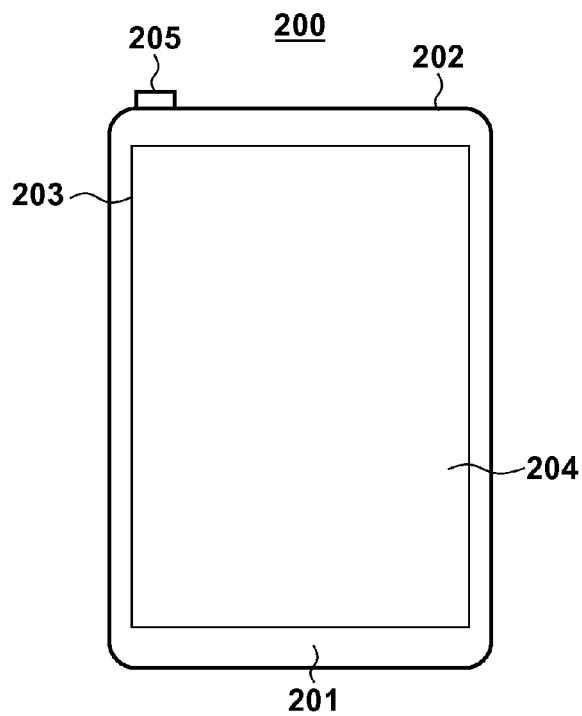
FIG. 2 is a view showing the outer appearance of a mobile communication terminal apparatus.

FIG. 2 is a view showing the outer appearance of the mobile communication terminal apparatus 200. The embodiment exemplifies a smartphone. The smartphone is a multi-function mobile phone which incorporates a camera, network browser, mail function, and the like in addition to the functions of a mobile phone. An NFC unit 201 performs communication using the NFC. When the user actually brings the NFC unit 201 close to a partner NFC unit within a range of about 10 cm, the NFC unit 201 can communicate with the partner NFC unit. A WLAN unit 202 is a unit for performing communication by the WLAN, and is arranged inside the apparatus. Note that the communicable range of the WLAN is wider than that of NFC communication. By the above-described handover, the WLAN can perform wireless communication in a wider range, compared to NFC communication. A display unit 203 is a display including an LCD display mechanism. An operation unit 204 includes a touch panel operation mechanism, and detects pressing information of the user on the touch panel. As a typical operation method, the display unit 203 displays buttons, and the user presses a button via the operation unit 204. As a result, an event of pressing the button is issued. A power key 205 switches between power-on and power-off.

Figure 3A:
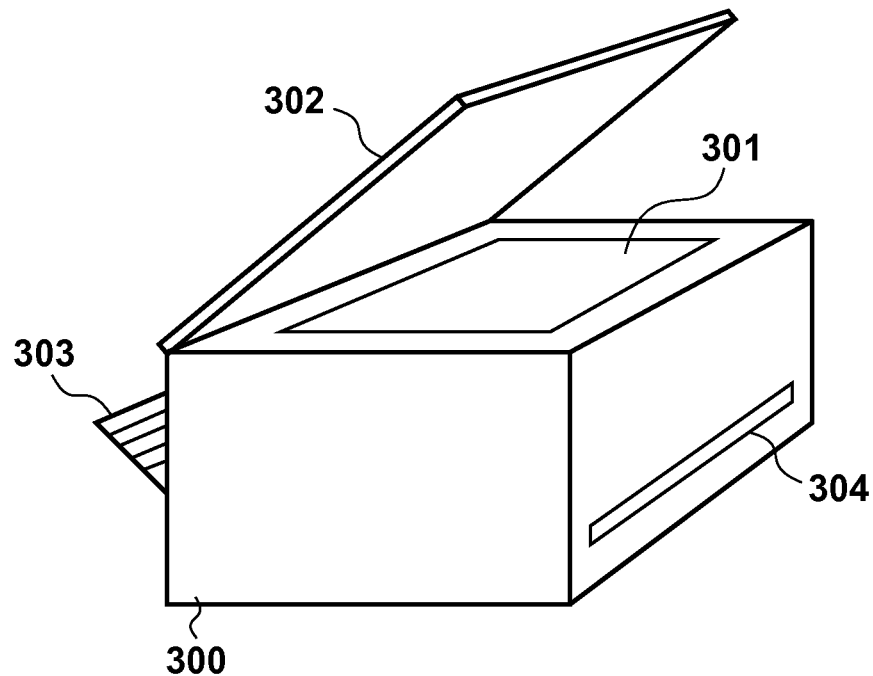
FIGS. 3A and 3B are views showing the outer appearance of an MFP.
Figure 3B:
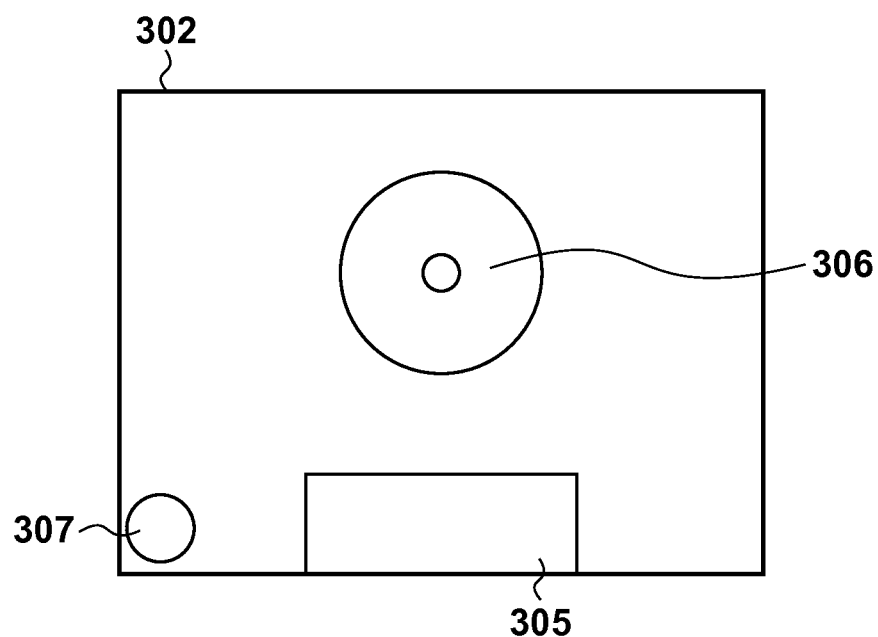

FIGS. 3A and 3B are views showing the outer appearance of the MFP. A platen 301 is a transparent glass table and is used to set an original on it and read the original by a scanner. An original cover 302 is a cover for preventing external leakage of reading light at the time of reading by the scanner. A printing sheet insertion port 303 is an insertion port at which sheets of various sizes are set. Sheets set at the printing sheet insertion port 303 are conveyed one by one to a printing unit, undergo printing of desired images, and are discharged from a printing sheet discharge port 304. An operation/display unit 305 and NFC unit 306 are arranged at the top of the original cover 302. The operation/display unit 305 will be described later with reference to FIG. 4. The NFC unit 306 is a unit for performing near field wireless communication, and serves as a position to which the user actually brings a partner apparatus. An effective distance at which it is determined that the partner apparatus contacts the NFC unit 306 is about 10 cm from the NFC unit 306. An antenna for performing communication by the WLAN is embedded in a WLAN antenna 307.

Figure 4:
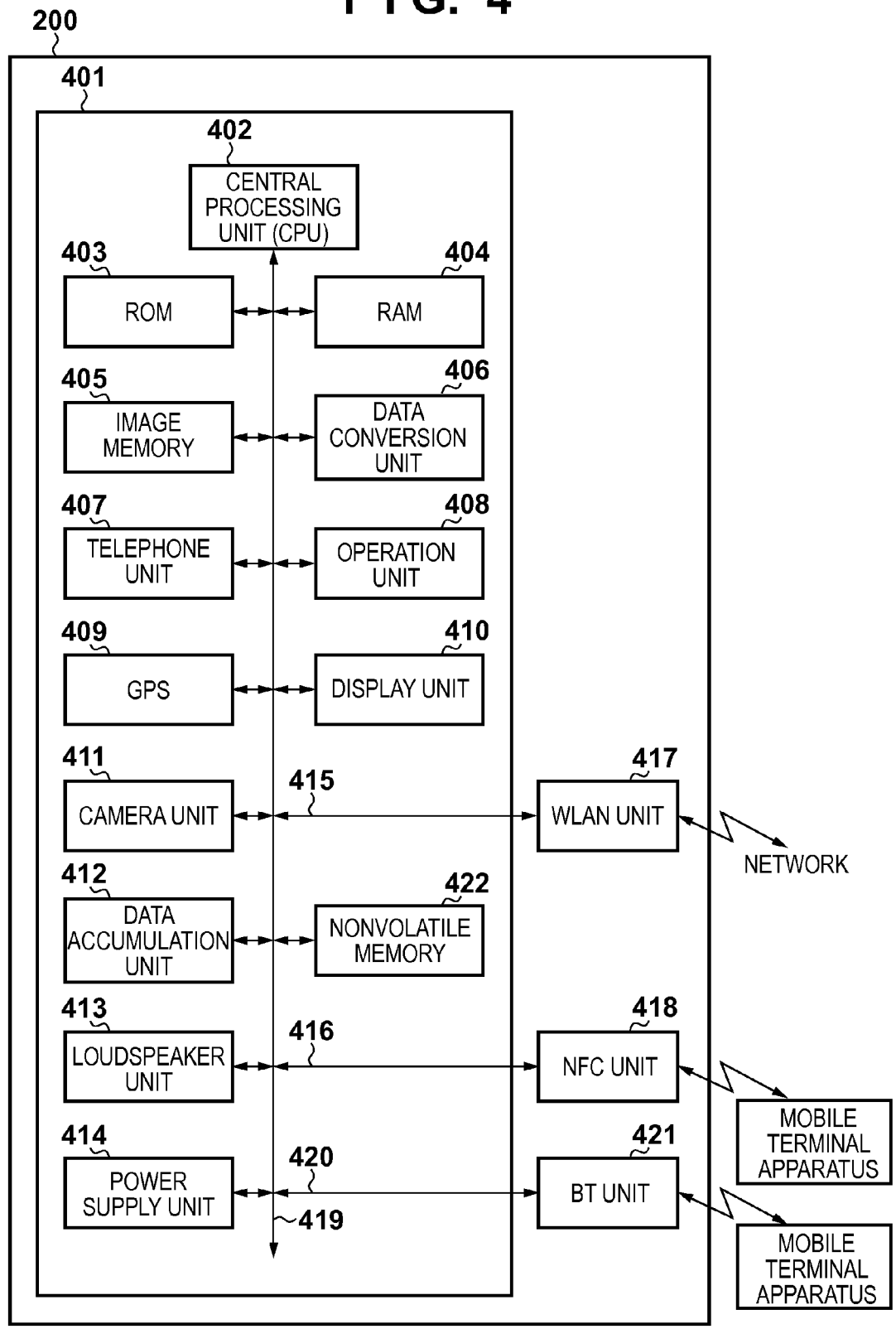
FIG. 4 is a block diagram showing the arrangement of the mobile communication terminal apparatus.

FIG. 4 is a block diagram showing the mobile communication terminal apparatus 200. The mobile communication terminal apparatus 200 includes a main board 401 which performs main control of the apparatus, a WLAN unit 417 which performs WLAN communication, an NFC unit 418 which performs NFC communication, and a BT unit 421 which performs Bluetooth® communication.

A CPU 402 of the main board 401 is a system control unit and controls the overall mobile communication terminal apparatus 200. A ROM 403 stores control programs to be executed by the CPU 402, an embedded operating system (OS) program, and the like. In the embodiment, respective control programs stored in the ROM 403 execute software control operations such as scheduling and task switching under the management of the embedded OS stored in the ROM 403.

A RAM 404 includes an SRAM (Static RAM) or the like, stores program control variables and the like, and also stores set values registered by the user, management data of the mobile communication terminal apparatus 200, and the like. In the RAM 404, various work buffer areas are allocated.

An image memory 405 includes a DRAM (Dynamic RAM) or the like, and temporarily stores image data received via a communication interface and image data read out from a data accumulation unit 412 so as to process them by the CPU 402. A nonvolatile memory 422 includes a flash memory or the like, and holds data even after power-off. The nonvolatile memory 422 saves, for example, telephone book data, past connected device information, and the like. Note that the memory configuration is not limited to this. For example, the image memory 405 and RAM 404 may be shared, or data may be backed up in the data accumulation unit 412. Although the DRAM is used in the embodiment, a hard disk, nonvolatile memory, or the like may be used.

A data conversion unit 406 performs analysis of a page description language (PDL) or the like, and data conversion such as color conversion or image conversion. A telephone unit 407 controls a telephone line, and implements telephone communication by processing audio data input/output via a loudspeaker unit 413. An operation unit 408 controls signals from the operation unit 204 in FIG. 2. A GPS (Global Positioning System) 409 acquires the current position information of the mobile communication terminal apparatus 200 such as the latitude and longitude. A display unit 410 electronically controls the display contents of the display unit 203 in FIG. 2, allows various input operations, and performs display of the operation and status of the MFP 300, and the like.

A camera unit 411 has a function of electronically recording and encoding an image input via a lens. An image captured by the camera unit 411 is saved in the data accumulation unit 412. The loudspeaker unit 413 has a function of inputting or outputting speech for the telephone function, and an alarm notification function and the like. A power supply unit 414 includes a portable battery and controls it. The power supply state includes a battery dead state in which the battery runs out, a power-off state in which the power key 205 is not pressed, an active state in which the apparatus is active normally, and a power saving state in which the apparatus is active in the power saving mode.

The mobile communication terminal apparatus 200 incorporates three arrangements (communication interfaces) for wirelessly communicating data with another device. The mobile communication terminal apparatus 200 can perform wireless communication by the WLAN, NFC, and Bluetooth®. The mobile communication terminal apparatus 200 uses the communication interface to convert data into packets and transmit the packets to an external device. Conversely, the mobile communication terminal apparatus 200 converts packets coming from an external device into data, and outputs the data to the CPU 402. The WLAN unit 417, NFC unit 418, and BT unit 421 are connected to bus cables, respectively. The WLAN unit 417, NFC unit 418, and BT unit 421 implement communications complying with the respective wireless communication standards. Details of the NFC unit will be described later with reference to FIG. 6. The building components 403 to 414, 417, 418, 421, and 422 are connected to each other via a system bus 419 managed by the CPU 402.

Figure 5:
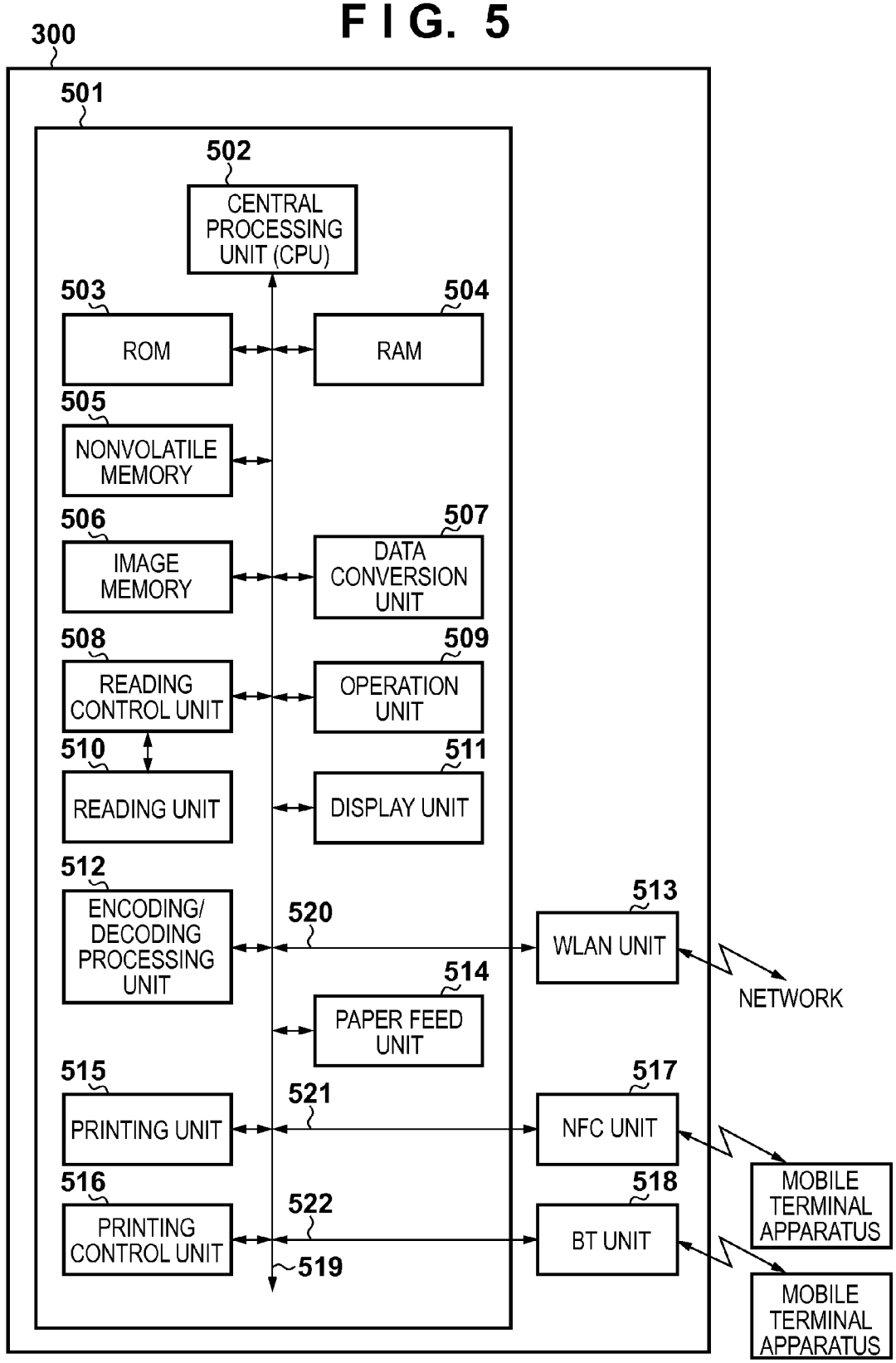
FIG. 5 is a block diagram showing the arrangement of the MFP.

FIG. 5 is a block diagram showing the schematic arrangement of the MFP 300. The MFP 300 includes a main board 501 which performs main control of the apparatus, a WLAN unit 513 which performs WLAN communication, an NFC unit 517 which performs NFC communication, and a BT unit 518 which performs Bluetooth® communication. A CPU 502 of the main board 501 is a system control unit and controls the overall MFP 300. A ROM 503 stores control programs to be executed by the CPU 502, an embedded operating system (OS) program, and the like. In the embodiment, control programs stored in the ROM 503 execute software control operations such as scheduling and task switching under the management of the embedded OS stored in the ROM 503.

A RAM 504 includes an SRAM (Static RAM) or the like, stores program control variables and the like, and also stores set values registered by the user, management data of the MFP 301, and the like. In the RAM 504, various work buffer areas are allocated. A nonvolatile memory 505 includes a flash memory or the like, and holds data even after power-off. The nonvolatile memory 505 stores, for example, network connection information and user data. An image memory 506 includes a DRAM (Dynamic RAM) or the like, and accumulates image data received via respective communication units, image data processed by an encoding/decoding processing unit 512, and the like. The memory configuration is not limited to this, similar to the mobile communication terminal apparatus 200. A data conversion unit 507 performs analysis of a page description language (PDL) or the like, conversion from image data into print data, and the like.

A reading control unit 508 will be described. A reading unit 510 optically reads an original by, for example, a CIS sensor (Contact Image Sensor). Then, an image processing control unit (not shown) executes various image processes such as binarization processing and halftone processing on an image signal converted into electrical image data, outputting high-resolution image data. An operation unit 509 and display unit 511 include keys to be manipulated by the user, and an LCD for presenting a display.

The encoding/decoding processing unit 512 performs encoding/decoding processing and enlargement/reduction processing on image data (for example, JPEG or PNG) handled by the MFP 300. A paper feed unit 514 can hold printing media for printing, and feed paper under the control of a printing control unit 516. The paper feed unit 514 may include a plurality of paper feed units to hold a plurality of types of printing media in one apparatus. In this case, the printing control unit 516 can control a paper feed unit from which paper is fed.

The printing control unit 516 executes various image processes such as smoothing processing, printing density correction processing, and color correction on image data to be printed via an image processing control unit (not shown) to convert the image data into high-resolution image data and output the converted image data to a printing unit 515. The printing control unit 516 periodically reads out information of the printing unit, and updates information in the RAM 504. Examples of the information to be updated are the remaining amount of an ink tank and the printhead state. The MFP 300 also incorporates three arrangements for performing wireless communication, as in the mobile communication terminal apparatus 200. The building components 502 to 516 are connected to each other via a system bus 519 managed by the CPU 502.

FIG. 6 is a block diagram showing the arrangement of each of the NFC units 418 and 517. First, NFC communication will be explained. When performing near field communication by an NFC unit, an apparatus which first outputs an RF (Radio Frequency) field to start communication will be called an initiator. An apparatus which responds to an instruction issued by the initiator and communicates with the initiator will be called a target.

Here, a passive mode and active mode will be explained. The passive mode and active mode exist as communication modes of the NFC unit. In the passive mode, the target responds to an instruction from the initiator by performing load modulation. Thus, the target does not require supply of power. In the active mode, the target responds to an instruction from the initiator by an RF field generated by the target itself. To do this, the target requires supply of power. The active mode can increase the communication speed, compared to the passive mode.

In the passive mode, a current flows through the coil of the target by an RF field generated by the initiator. The target uses the current as power for data communication. Even when no power is supplied from a battery or an AC power supply to the target in the passive mode, the target and initiator can communicate with each other.

The arrangement of an NFC unit 600 will be explained with reference to FIG. 6. The NFC unit 600 includes an NFC controller unit 601, antenna unit 602, RF unit 603, transmission/reception control unit 604, NFC memory 605, power supply 606, and device connection unit 607. The antenna unit 602 receives radio waves or carriers from another NFC device, or transmits radio waves or carriers to another NFC device. The RF unit 603 has a function of modulating/demodulating an analog signal into a digital signal. The RF unit 603 includes a synthesizer. The RF unit 603 identifies band and channel frequencies, and controls the band and channel based on frequency allocation data. The transmission/reception control unit 604 performs control regarding transmission/reception such as assembly and disassembly of a transmission/reception frame, addition and detection of a preamble, and frame identification. The transmission/reception control unit 604 also controls the NFC memory 605, and reads/writes various data and programs. When the NFC unit 600 operates in the active mode, it receives supply of power via the power supply 606, and communicates with the main body via the device connection unit 607 or communicates with another NFC device falling within a communicable range by using carriers transmitted/received via the antenna unit 602. When the NFC unit 600 operates in the passive mode, it receives carriers from another NFC device via the antenna, receives supply of power from another NFC device by electromagnetic induction, and transmits/receives data to/from the other NFC device by carrier modulation.

Data names and data structures used in the embodiment will be explained with reference to FIGS. 14A to 14C.

Figure 14A:
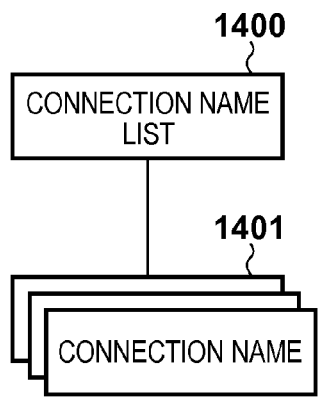
FIGS. 14A to 14C are views showing the structures of a connection name list, connection information, and job information.

FIG. 14A shows the structure of a connection name list. A connection name list 1400 manages a plurality of connection names 1401 as a list. The connection name 1401 is identification information capable of uniquely specifying a handover destination, and is, for example, a character string. In other words, the connection name 1401 suffices to be a name from which the users of the mobile communication terminal apparatus 200 and MFP 300 can uniquely identify a handover destination. For example, when the handover destination is the mobile communication terminal apparatus 200 having the telephone function, the connection name 1401 is a telephone number or the serial number of the apparatus. When the handover destination indicates the position of a folder on a network, the connection name 1401 may be a URL. When the handover is performed by the WLAN, the connection name 1401 may be a MAC address. When the handover is performed by Bluetooth, the connection name 1401 may be a BD address.

Figure 14B:
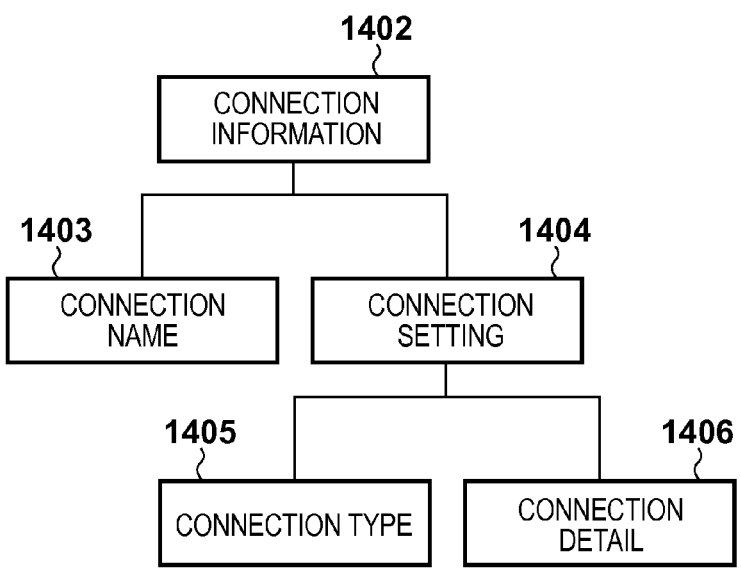

FIG. 14B shows the structure of connection information. Connection information 1402 includes a connection name 1403 and connection setting 1404. The connection name 1401 and connection name 1403 are data having the same structure. The connection setting 1404 is data necessary to perform the handover, and includes a connection type 1405 and connection detail 1406. The connection type 1405 describes a communication method for performing the handover, and designates, for example, the WLAN or Bluetooth. The connection detail 1406 is information for actually connecting an apparatus by the WLAN or Bluetooth. When WPS (Wi-Fi Protected Setup) is used for WLAN connection, the connection detail 1406 is WPS Credential authentication information. In connection with the mobile communication terminal apparatus 200 by Bluetooth, the connection detail 1406 is OOB authentication information. In connection with the server apparatus 101 via the LAN, the connection detail 1406 is network information such as the server name or IP address of the server apparatus 101. FIG. 9 shows WPS authentication 901 and Bluetooth authentication 902 as examples of the connection information.

Figure 14C:
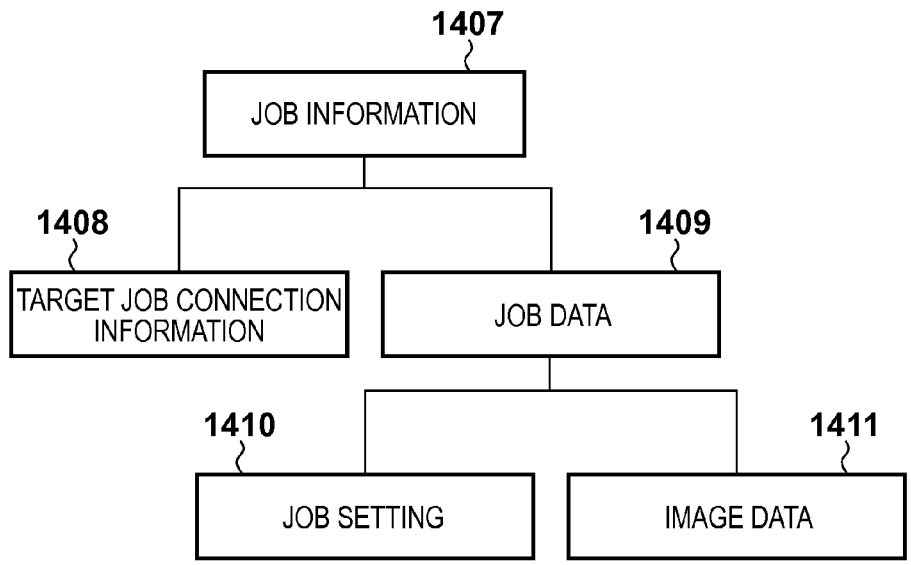

FIG. 14C shows the structure of job information. Job information 1407 includes target job connection information 1408 and job data 1409. The target job connection information 1408 is connection information for the handover to be used in a job, and has the same structure as that of the connection information 1402. The job data 1409 includes a job setting 1410 and image data 1411. The job data 1409 describes the type of job such as a print job, scan job, or FAX job. The job setting 1410 describes setting information of a job. For example, for a print job, the job setting 1410 describes a paper setting, printing mode setting, paper feed tray setting, discharge tray setting, imposition setting, color setting, copy count setting, scaling setting, user setting, and the like. For a scan job, the job setting 1410 describes a resolution setting, reading mode setting, save destination setting, save destination password, and the like. For a FAX job, the job setting 1410 describes a transmission number, transmission image quality setting, broadcast setting, retransmission setting, and the like. The image data 1411 stores an image to be used in a job. For example, the image data 1411 stores image data to be printed for a print job, and stores FAX data to be transmitted for a FAX job.

Figure 7A:
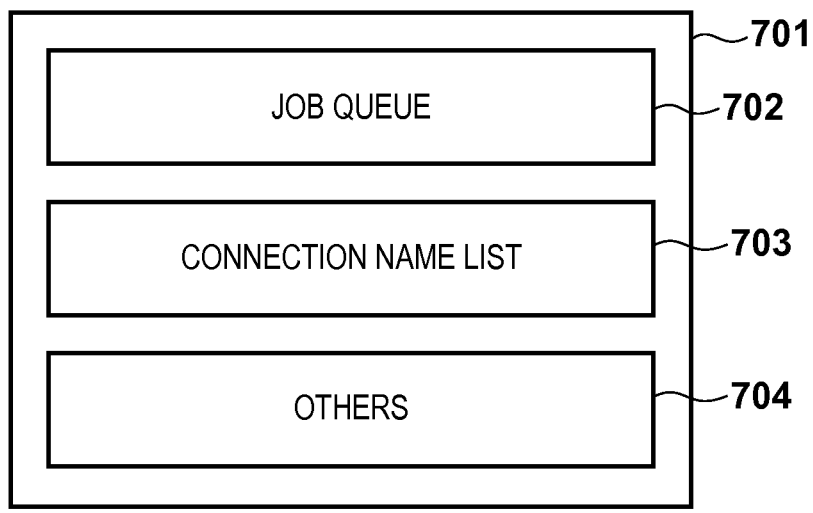
FIGS. 7A and 7B are views each showing the structure of the NFC memory of the MFP.
Figure 7B:
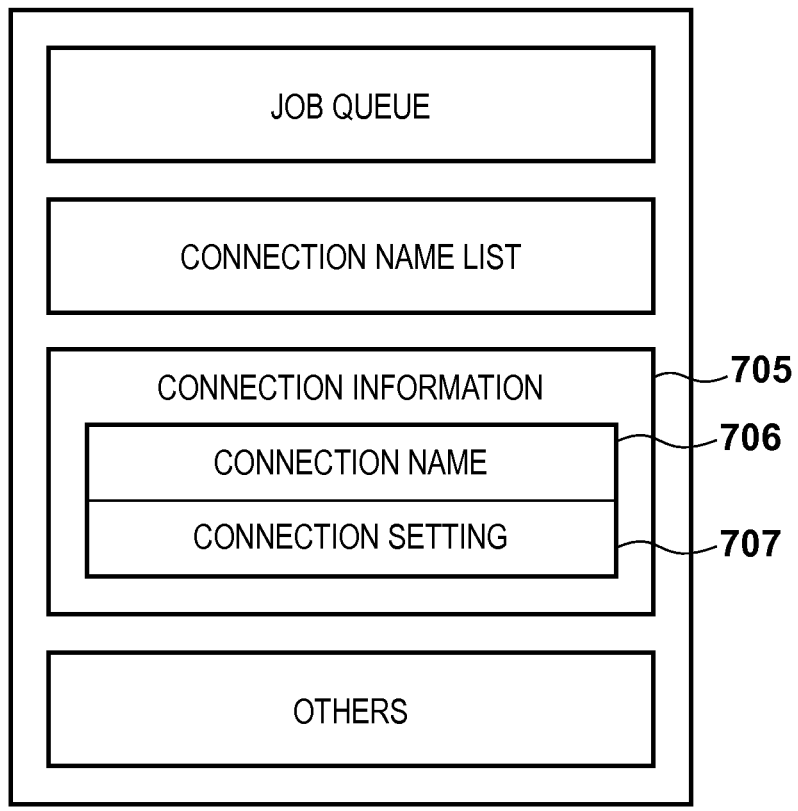

FIGS. 7A and 7B are views each showing the data structure of the NFC memory 605 in the NFC unit 517 of the MFP 300. FIG. 7A shows the data structure of the NFC memory 605 when the mobile communication terminal apparatus 200 transmits a job to an NFC memory 701 of the MFP 300. A connection name 703 specifies the name of a connection destination (apparatus) in which the connection setting information 1404 for performing wireless communication by the MFP 300 using the handover is stored in the internal memory of the MFP 300. More specifically, when transmitting a job, the mobile communication terminal apparatus 200 confirms the connection name list 703 and can determine that connection information corresponding to the mobile communication terminal apparatus 200 has already been stored in the MFP 300.

As described above, for example, even when no power is supplied from an AC power supply or a battery to the MFP 300 and no power is supplied to the NFC unit, the NFC unit can perform communication as a target in the passive mode. For example, when no power is supplied from an AC power supply or a battery to the MFP 300, information stored in the NFC memory is sometimes read by an external apparatus.

In the embodiment, the connection name list 1400 is stored in the NFC memory readable/writable from another user, and the connection setting information 1404 including various kinds of information (for example, authentication information) necessary in the handover is stored in the internal memory of the MFP 300. When the mobile communication terminal apparatus 200 confirms its name, telephone number, or the like in the connection name 703, it does not transmit the connection setting information 1404, and the MFP 300 refers to the connection setting information 1404 stored in the internal memory of the MFP 300. In this case, the mobile communication terminal apparatus 200 does not transmit the connection setting information 1404, and the connection setting information 1404 need not be stored in the NFC memory. This can enhance the security of communication information.

Note that the NFC memory 605 is configured as a job queue because the user may execute a job immediately after transmitting the job, or may transmit a plurality of jobs and then execute them. That is, even when the MFP 300 is OFF or in the power saving mode, the user can transmit a job. For this reason, the user may transmit a plurality of jobs till the activation time of the MFP 300.

In some cases, when transmitting a job to the NFC memory 701 of the MFP 300, the mobile communication terminal apparatus 200 confirms the connection name 703 and determines that its name or telephone number is not included in the list. At this time, it can be determined that no handover information is stored in the internal memory of the MFP 300. In this case, the mobile communication terminal apparatus 200 transmits connection information together with the job to the NFC memory. FIG. 7B shows a data structure in a case in which the mobile communication terminal apparatus 200 performs this transmission.

Note that pieces of connection information 705 can be held in correspondence with jobs for which no handover information is stored. Since the connection information 705 is transmitted only when the connection name list 1400 does not include handover information, the amount of data stored in the NFC memory 701 can be reduced.

FIG. 8 is a view showing the structure of the nonvolatile memory 505 in the MFP 300. As the nonvolatile memory 505, a flash memory or the like is used. Information stored in the nonvolatile memory 505 as shown in FIG. 8 is developed into RAM, when the MFP 300 is power-on or the MFP 300 is in an operation mode for receiving job data by the NFC. Reference numeral 801 denotes an overall RAM. User data 802 stores information about a user. For example, the user data 802 stores setting information, FAX telephone number, communication history, network information, and the like. A "list of apparatuses connected in the past" 803 stores a list for specifying apparatuses which have been connected to the MFP 300 by the handover in the past. The list includes one or more apparatuses of which a name is represented by the connection name 703. For example, when the MFP 300 is handover-connected to camera A by the WLAN, information is stored in a camera A 804. A connection name 805 stores information from which the user can uniquely identify a connected apparatus, such as the serial number of a camera. A connection setting 806 stores information representing the WLAN, and WPS Credential authentication information. Similarly, information upon handover connection is also stored in a smartphone B 807. Setting information 817 stores setting information of the MFP 300. For example, the setting information 817 stores menu items such as the printing mode, inkjet printhead correction information, and the like. "Others" 818 stores other kinds of nonvolatile information.

Figure 10:
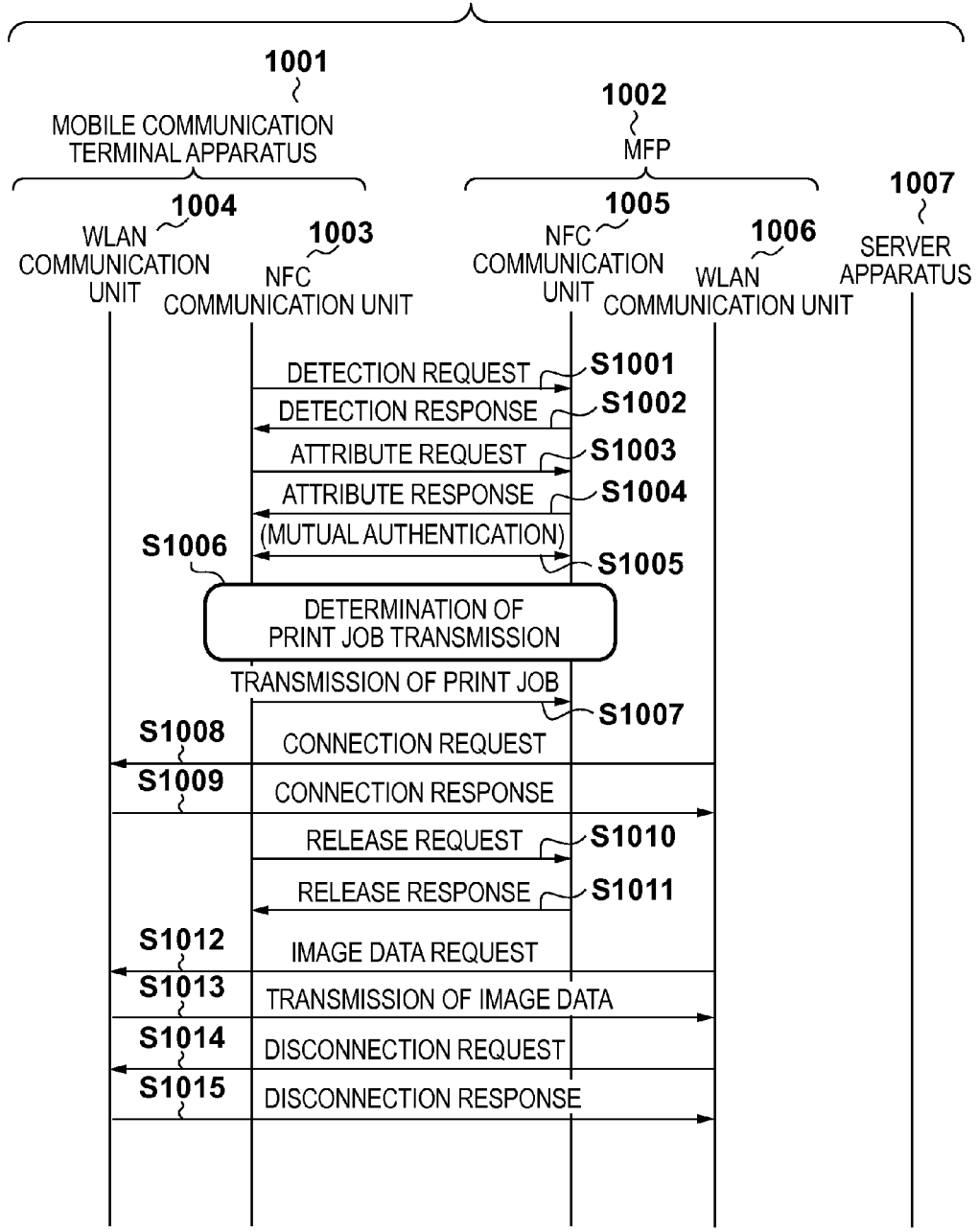
FIG. 10 is a chart showing a sequence to execute a job by the mobile communication terminal apparatus and MFP using the handover.

FIG. 10 shows a handover sequence to switch between the NFC and the WLAN and transfer data. The communication speed of the NFC is as relatively low as several hundred bps. Efficient data transfer can therefore be implemented by performing authentication or the like by the NFC, and transmitting a large amount of data by the higher-speed WLAN. In the embodiment, an example in which the handover destination is the mobile communication terminal apparatus 200 itself will be explained with reference to FIG. 10. An example in which the handover destination is the server apparatus 101 will be explained with reference to FIG. 11. A mobile communication terminal apparatus 1001 in FIG. 10 and a mobile communication terminal apparatus 1101 in FIG. 11 correspond to the mobile communication terminal apparatus 200 in FIG. 1. An MFP 1002 in FIG. 10 and an MFP 1102 in FIG. 11 correspond to the MFP 300 in FIG. 1.

Processing in FIG. 10 is executed by the CPU 402 of the mobile communication terminal apparatus 200 and the CPU 502 of the MFP 300. More specifically, programs for executing the processing shown in FIG. 10 are stored in the ROMs 403 and 503 and executed by the CPUs 402 and 502, thereby implementing the processing shown in FIG. 10.

In step S1001, to establish NFC communication, an NFC communication unit 1003 serves as an initiator and detects an NFC communication unit 1005 as a target. If the NFC communication unit 1005 is detected correctly, the NFC communication unit 1005 transmits a detection response in step S1002. In the example of FIG. 10, the mobile communication terminal apparatus 1001 serves as an initiator. In practice, the MFP 1002 may serve as an initiator based on a user input from the operation unit 305. If the NFC communication unit 1003 receives the detection response correctly, it transmits in step S1003 an attribute request for performing NFC communication. Upon receiving the attribute request, the NFC communication unit 1005 sends back an attribute response in step S1004. By the attribute request and response, the NFC IDs of the initiator and target are transmitted to specify the communication partners based on the IDs.

In step S1005, mutual authentication is performed, and cryptographic keys for data encryption or the like are transferred to the partners. This mutual authentication may not be performed when, for example, there is no need to transfer cryptographic keys. In step S1006, the NFC communication unit 1003 determines whether to transmit a print job to the NFC communication unit 1005, details of which will be described with reference to FIG. 12. If the NFC communication unit 1003 determines in step S1006 to transmit a print job, it transmits the print job in step S1007. When transmitting the print job, an access key to the mobile communication terminal apparatus 200 may be included in the print job and transmitted to perform authentication based on the access key upon the handover via the WLAN, thereby further enhancing security.

The process shifts to step S1008, and a WLAN communication unit 1006 issues a connection request to a WLAN communication unit 1004. At this time, authentication is performed using the access key received in step S1007 to send back a connection response in step S1009, thereby establishing a WLAN connection. After switching from NFC communication to the WLAN in this manner, the NFC communication unit 1003 transmits a release request in step S1010. Upon receiving the release request, the NFC communication unit 1005 transmits a release response in step S1011, ending the NFC communication. Steps S1008 and S1009, and steps S1010 and S1011 may be executed in the reverse order.

In step S1012 and subsequent steps, WLAN communication is performed. In step S1012, the WLAN communication unit 1006 requests image data, and confirms with the WLAN communication unit 1004 whether data transfer is possible. In this case, contents to be confirmed are, for example, a free space for temporarily saving an image to be transferred into the MFP 1002. If the WLAN communication unit 1004 can transmit image data upon receiving the image data request, it transmits image data in step S1013. If the WLAN communication unit 1006 has normally received the image, it transmits a disconnection request in step S1014. In step S1015, the WLAN communication unit 1004 sends back a disconnection response, ending the communication. The MFP 1002 may transmit the disconnection request at the timing after the end of printing or before printing. When the communication is disconnected after the end of printing, the printing status can be notified. When the communication is disconnected before the end of printing, the power consumption and communication amount can be saved. As described above, a large amount of data can be transferred using a higher-speed communication protocol.

Figure 11:
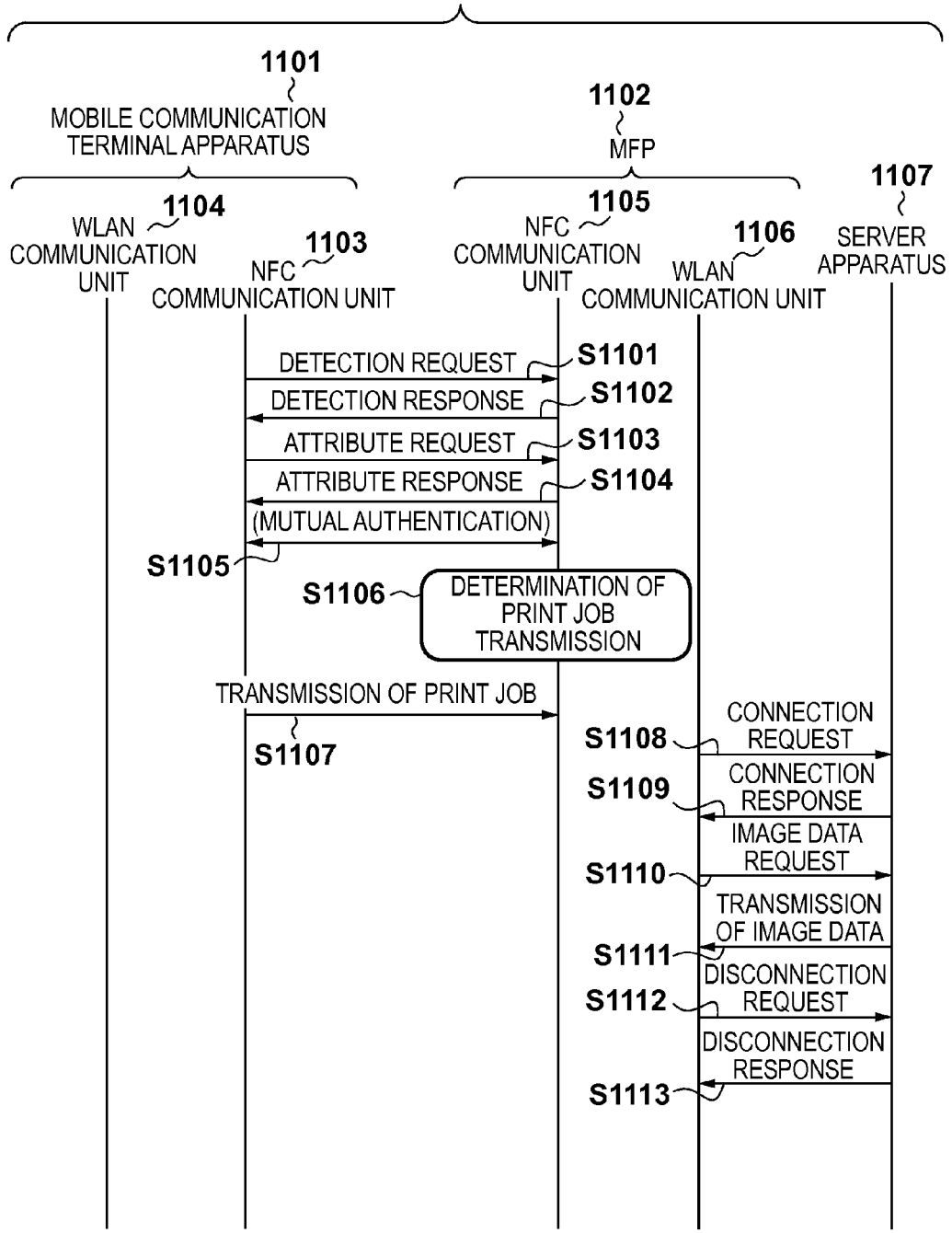
FIG. 11 is a chart showing a sequence when the mobile communication terminal apparatus transmits a job to the MFP and then the MFP executes a job from another server apparatus by the handover.

FIG. 11 shows a sequence when the mobile communication terminal apparatus 1101 transmits a job and then the MFP 1102 is connected to a server apparatus 1107 serving as a handover destination. The sequence in FIG. 11 is different from that in FIG. 10 in that the communication destination in processes of step S1107 corresponding to step S1007, and subsequent steps is not the mobile communication terminal apparatus but the server apparatus.

More specifically, the description of steps S1108, S1109, S1110, S1111, S1112, and S1113 is the same as that of steps S1008, S1009, S1012, S1013, S1014, and S1015 in FIG. 10 except that the communication destination from the MFP 1102 is the server apparatus 1107. Although NFC communication between the mobile communication terminal apparatus 1101 and the MFP 1102 is maintained in FIG. 11, processes corresponding to steps S1010 and S1011 may be performed after step S1107.

Figure 12:
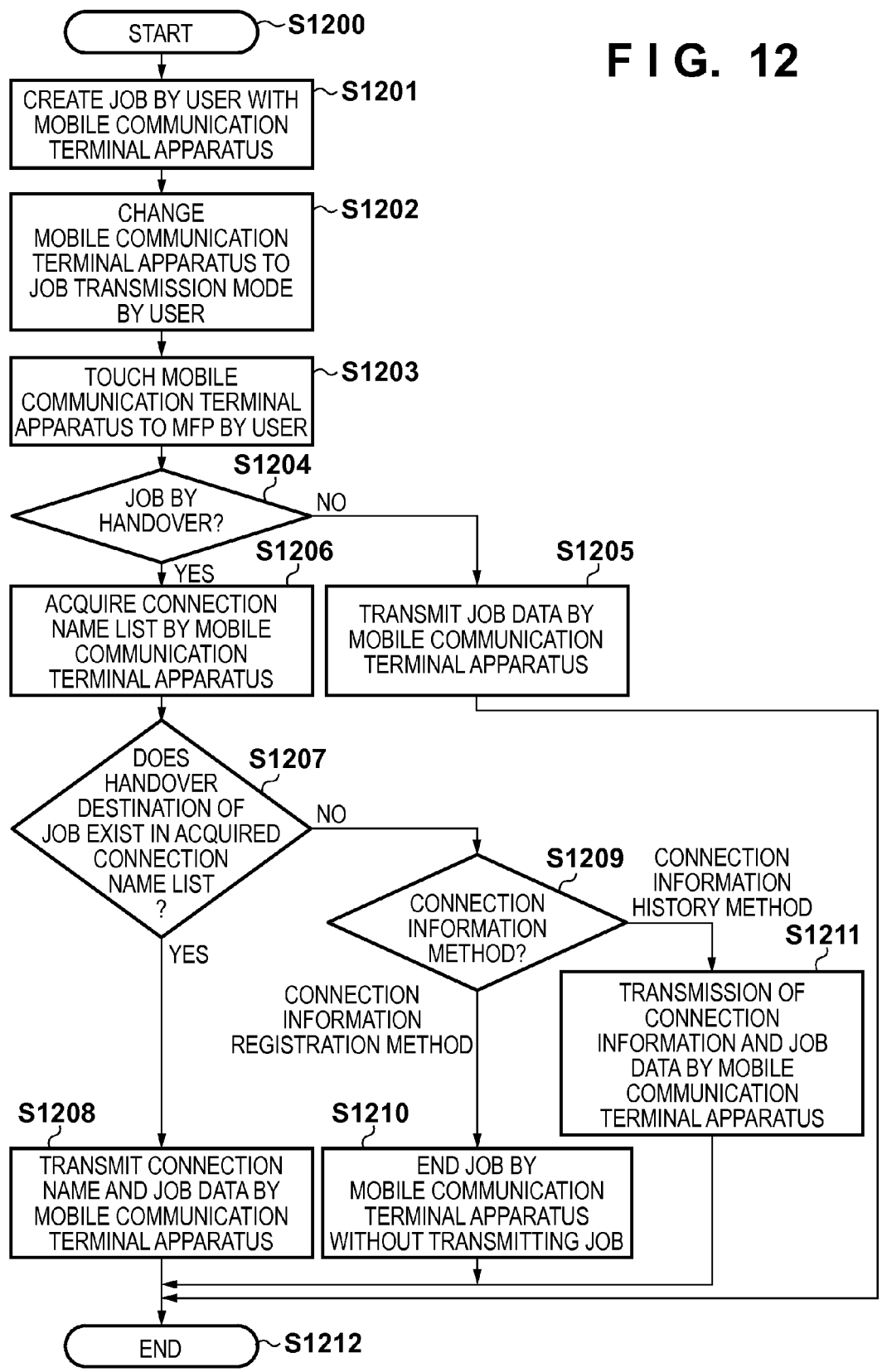
FIG. 12 is a flowchart when transmitting a job from the mobile communication terminal apparatus.

Next, details of the processes of steps S1006, S1007, or steps S1106 and S1107 will be explained with reference to FIG. 12. In this sequence, the mobile communication terminal apparatus 200 determines whether to transmit a job, and if the job is to be transmitted, determines whether the job is transmitted singly or together with connection information. The process starts in step S1200. In step S1201, the user generates a desired job (for example, a print job) in the mobile communication terminal apparatus 200, and the process advances to step S1202. In step S1202, the user changes the mobile communication terminal apparatus 200 to a job transmission mode, and the process advances to step S1203. In step S1203, the user brings the mobile communication terminal apparatus 200 close to the MFP 300 until it is determined that the mobile communication terminal apparatus 200 contacts the MFP 300. After that, the request response sequence in steps S1001 to S1005 or S1101 to S1105 is performed. In step S1204 and subsequent steps, the determination processing in step S1006 or S1106 is executed.

In step S1204, the mobile communication terminal apparatus 200 determines whether the job requires the handover (job determination). If the mobile communication terminal apparatus 200 determines that the job does not require the handover, it transmits job data to the MFP 300 by NFC communication in step S1205, and ends the process (step S1212). If the mobile communication terminal apparatus 200 determines that the job requires the handover, the process advances to step S1206. In the determination processing of step S1204, for example, when the storage location of image data to be printed is an external server apparatus, the mobile communication terminal apparatus 200 determines that the job requires the handover.

The mobile communication terminal apparatus 200 acquires the connection name list 703 in the NFC memory 605 of the NFC unit 517 of the MFP 300 in step S1206, and then the process advances to step S1207. For example, the mobile communication terminal apparatus 200 requests the connection name list 703 of the MFP 300, thereby acquiring it. In this case, the MFP 300 transmits information about a connection information registration method (to be described later) to the mobile communication terminal apparatus 200 together with the connection name list 703. In step S1207, the mobile communication terminal apparatus 200 confirms whether information (for example, a name or telephone number) corresponding to the mobile communication terminal apparatus 200 exists in the acquired connection name list 703. Accordingly, the mobile communication terminal apparatus 200 can determine whether handover information of the mobile communication terminal apparatus 200 is stored in the internal memory of the MFP 300. If the mobile communication terminal apparatus 200 determines that the handover information of the mobile communication terminal apparatus 200 exists in the internal memory of the MFP 300, the process advances to step S1208. If the mobile communication terminal apparatus 200 determines that the handover information of the mobile communication terminal apparatus 200 does not exist in the internal memory of the MFP 300, the process advances to step S1209.

In step S1208, the mobile communication terminal apparatus 200 transmits the connection name 1401 and job data 1409 to the MFP 300, as an instruction for MFP 300 to execute WLAN communication in S1008 using connection setting such as the connection setting 806 stored in MFP 300. At this time, transmission is controlled not to transmit the connection setting 1404 of the target job connection information 1408 to the MFP 300. More specifically, the sequence of steps S1206, S1207, and S1208 is executed, and when handover information has already been saved in the nonvolatile memory of the MFP 300, transmission is controlled to transmit only the uniquely identifiable connection name 1401 without transmitting handover information. Since no connection detail information is stored in the NFC memory which can be relatively easily accessed from another user, the security of connection information including authentication information and the like can be enhanced.

In step S1209, the mobile communication terminal apparatus 200 confirms the connection information method. The connection information method will be explained here. The connection information method includes a connection information registration method and connection information history method. In the connection information registration method, the user registers in advance handover connection information in the nonvolatile memory by using the operation unit of the MFP 300. When the user performs the registration operation, the connection information is registered in "connection information registered by user" 810 in the nonvolatile memory of the MFP 300. In this method, the NFC memory of the MFP 300 is configured as shown in FIG. 7A. In this case, only a connection destination registered by the user can perform the handover.

In the connection information history method, every time the handover is performed, handover information is added to the "connection information about past connections" 803 in the nonvolatile memory of the MFP 300. In this method, the NFC memory of the MFP 300 is configured as shown in FIG. 7B. When a new handover destination is transmitted to the connection information 705, it is added to the connection information 803 after the end of the communication, and the connection information 705 is deleted from the NFC memory after the addition. Only when a job transmitted from the mobile communication terminal apparatus 200 requires the handover and the handover destination is new in the MFP 300, the mobile communication terminal apparatus 200 can transmit connection information to the MFP 300. Note that the user may switch between the connection information registration method and the connection information history method on a menu screen displayed on the mobile communication terminal apparatus 200 or MFP 300. The connection information registration method can further enhance security because connection information is not stored even once in the NFC memory though the user needs to first add connection information to the connection information 810 registered by him. The connection information history method can improve even user friendliness while relatively enhancing security because connection information is stored once in the NFC memory but is automatically added to the connection information 803.

If the mobile communication terminal apparatus 200 determines in step S1209 that the connection information method is the connection information registration method, the process advances to step S1210. Here, it is determined in step S1207 that information corresponding to the mobile communication terminal apparatus 200 does not exist in the connection name list 1400. In short, when the connection information is not registered in the MFP 300 although the connection information method is the connection information registration method, the processing advances to step S1210. On the other hand, if the mobile communication terminal apparatus 200 determines in step S1209 that the connection information method is the connection information history method, the process advances to step S1211. In step S1210, the mobile communication terminal apparatus 200 ends the job without transmitting it, displays, on the display units 410 and 511, a warning that the job cannot be executed because the handover destination of the job does not exist in the connection name list, and ends the process in step S1212. If the mobile communication terminal apparatus 200 determines in step S1209 that the connection information method is the connection information history method, the mobile communication terminal apparatus 200 transmits connection information and job data to the connection information 705 of the NFC memory of the MFP 300 in step S1211.

As described above, if it is determined in step S1207 that information corresponding to the mobile communication terminal apparatus 200 exists in the connection name list 1400, the connection name 1401 is transmitted to the MFP 300 in step S1208. However, connection information for performing handover (handover information) is not transmitted to the MFP 300. In that case, the MFP 300 acquires connection information corresponding to the transmitted connection name 1401 from information as shown in FIG. 8, and performs handover using the acquired connection information.

Accordingly, if information corresponding to the mobile communication terminal apparatus 200 exists in the connection name list 1400 (if connection information corresponding to the connection name 1401 has already been transmitted to the MFP 300 and registered in the MFP 300), it is not necessary for the mobile communication terminal apparatus 200 to transmit connection information again to the MFP 300 and handover can be performed. A sequence implemented in the MFP 300 will be explained with reference to FIG. 15.

Figure 15:
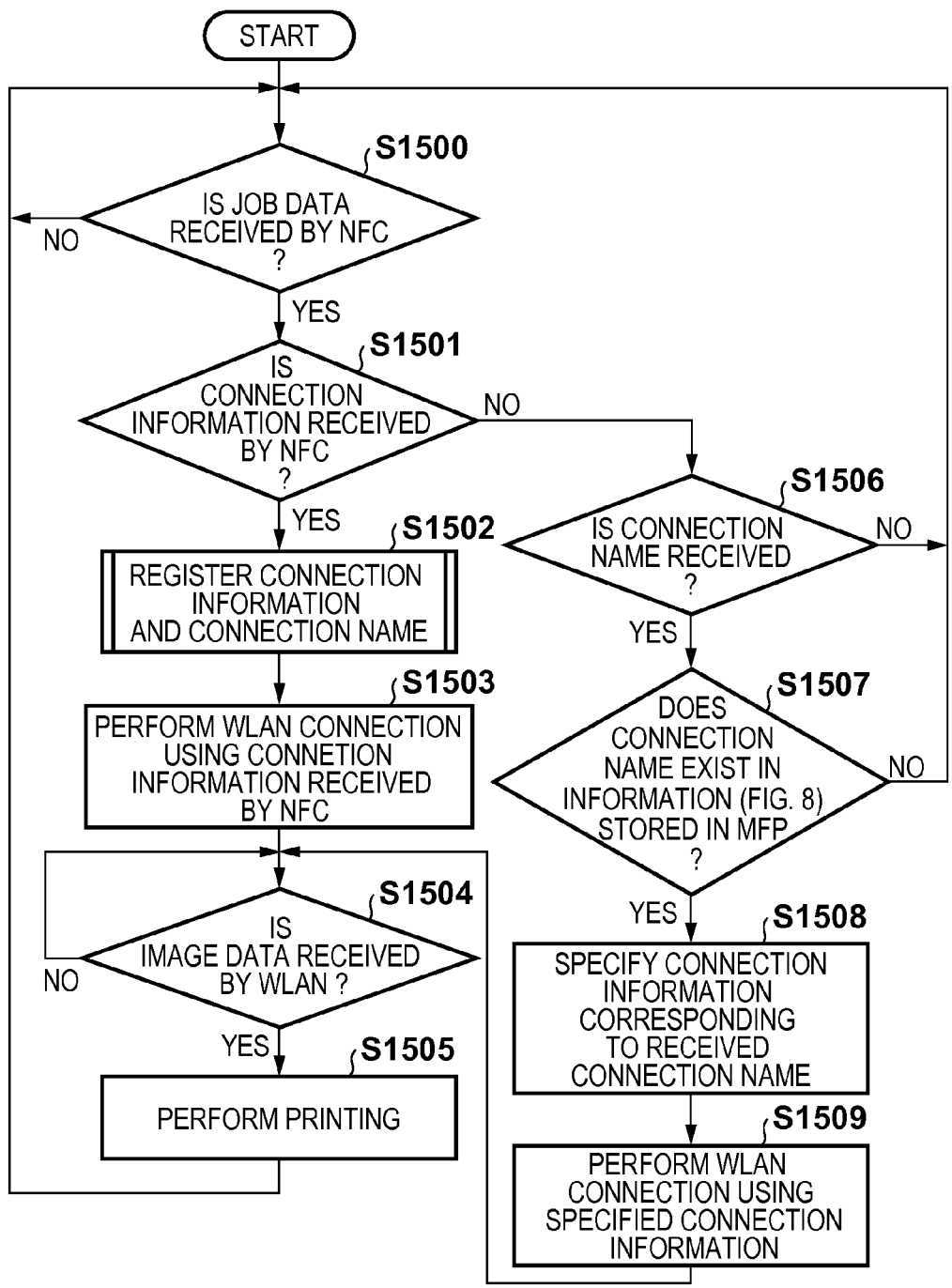
FIG. 15 is a flowchart to perform handover in the MFP 300.

FIG. 15 shows a flowchart to perform handover in the MFP 300. The sequence of FIG. 15 may be implemented by the CPU 502 reading out a program from the ROM 503 to be executed in the RAM 504.

In FIG. 15, when the MFP 300 is power-on or the MFP 300 is in an operation mode for receiving job data by the NFC, the sequence starts. And, when the MFP 300 is power-off or the operation mode for receiving job data by the NFC ends, the sequence ends.

In step S1500, the CPU 502 determines whether job data is received by the NFC unit 517 from the mobile communication terminal apparatus 200. If it is determined in step S1500 that job data is not received by the NFC unit 517 from the mobile communication terminal apparatus 200, the determination of S1500 is performed again.

If it is determined in step S1500 that job data is received by the NFC unit 517 from the mobile communication terminal apparatus 200, the process advances to step S1501. In step S1501, the CPU 502 determines whether the connection information corresponding to the mobile communication terminal apparatus 200 is received by the NFC. If it is determined in step S1501 that the connection information corresponding to the mobile communication terminal apparatus 200 is received by the NFC, the process advances to step S1502. On the other hand, if it is determined in S1501 that the connection information corresponding to the mobile communication terminal apparatus 200 is not received by the NFC, the process advances to step S1506.

In step S1502, the CPU 502 registers the received connection information and the connection name 1401 received with the connection information. Specifically, the CPU 502 stores the connection name 1401 in the NFC memory (shown in FIGS. 7A and 7B) of the NFC unit 517, and stores the connection name 1401 and the connection information in the nonvolatile memory 505 as the information shown in FIG. 8. Details of the processing of S1502 will be described later with reference to FIG. 13.

In step S1503, the CPU 502 performs processing for establishing WLAN connection to the mobile communication terminal apparatus 200 by using the connection information which is received by the NFC unit 517 and stored in the memory of the NFC 517. This processing is similar to the processing described in steps S1008 and S1009 of FIG. 10.

In step S1504, the CPU 502 determines whether image data is received by the WLAN unit 513. If it is determined in S1504 that the image data is received by the WLAN unit 513, the process advances to step S1505. If it is determined in S1504 that the image data is not received by the WLAN unit 513, the determination of S1504 is performed again.

In step S1505, the CPU 502 controls the printing unit 515 to print an image on a printing medium based on the image data received in step S1504. And then, the process returns to step S1500.

If it is determined in step S1501 that the connection information corresponding to the mobile communication terminal apparatus 200 is not received by the NFC, the process advances to step S1506. In step S1506, the CPU 502 determines whether the connection name 1401 is received by the NFC. If it is determined in step S1506 that the connection name 1401 is not received by the NFC, the process returns to step S1500.

If it is determined in step S1506 that the connection name 1401 is received by the NFC, the process advances to step S1507. In step S1507, the CPU 502 determines whether the received connection name 1401 exists in information developed in the RAM of the MFP 300 as shown in FIG. 8. If it is determined in step S1507 that the received connection name 1401 exists in information developed in the RAM of the MFP 300, the process advances to step S1508. On the other hand, if it is determined in step S1507 that the received connection name 1401 does not exist in information developed in the RAM of the MFP 300, the process returns to step S1500.

In step S1508, the CPU 502 specifies the connection information corresponding to the connection name 1401 received by the NFC among the connection information shown in FIG. 8.

In step S1509, the CPU 502 performs processing for establishing WLAN connection to the mobile communication terminal apparatus 200 by using the connection information specified in step S1508. This processing is similar to the processing of S1503. And then, the process advances to step S1504.

As described in FIG. 15, the MFP 300 can perform establishing WLAN connection by using the connection information corresponding to the received connection name, even though the connection information is not received by the NFC. The MFP 300 has registered the connection information of the mobile communication terminal apparatus 200 for which the WLAN connection was performed in the past. Accordingly, the MFP 300 can perform handover to the mobile communication terminal apparatus 200, even though the MFP 300 does not receive the connection information from the mobile communication terminal apparatus 200.

In FIG. 15, it is described regarding an example that a job is a print job. However, the job may be a scan job. In that case, after the MFP 300 performs handover, the MFP 300 controls the reading unit 510 to read an original. And then, the MFP 300 transmits the read image data to the mobile communication terminal apparatus 200 by the WLAN.

FIG. 13 shows a sequence to, when the connection information method is the connection information history method, transmit a new handover destination from the mobile communication terminal apparatus 200 to the NFC memory 605 of the MFP 300, save connection information in the nonvolatile memory of the main body of the MFP 300, and then update the connection name list 1400 of the NFC memory 605. FIG. 13 shows a detailed sequence of step S1503 in FIG. 15.

The process starts in step S1301. In step S1302, the MFP 300 saves the received connection information and job data in the NFC memory 605, and the process advances to step S1303.

In step S1303, the MFP 300 determines whether the nonvolatile memory of the main body of the MFP 300 is usable. The MFP 300 repeats this determination processing until the nonvolatile memory of the main body becomes usable. Even when the apparatus main body is OFF or in the power saving mode and the nonvolatile memory of the main body is unusable, the NFC chip is in a readable/writable state. Hence, if a job is transmitted from the mobile communication terminal apparatus 200 in power-off and written in the NFC chip, the CPU 502 is notified of an interrupt to activate the MFP 300. In this case, the process waits for activation of the main body of the MFP 300 in step S1303.

If write in the nonvolatile memory of the main body of the MFP 300 becomes possible in step S1303, the process advances to step S1304. In step S1304, the MFP 300 adds the connection information to the "connection information about past connections" 803 based on the connection information and job data received in step S1211, and the process advances to step S1305. In step S1305, the connection name list 703 of the NFC memory is updated to be synchronized with the "connection information about past connections" 803. After the update, the data added in step S1211 to the connection information 705 of the NFC memory of the MFP 300 is deleted. The process then advances to step S1306, ending the process.

Note that the above-described embodiment has described the arrangement in which each of the mobile communication terminal apparatus and MFP includes a communication unit configured to perform wireless communication. However, the present invention is not limited to this, and the processing according to the embodiment may be executed when an external communication unit is mounted in each of the mobile communication terminal apparatus and MFP.

The above-described embodiment has exemplified the connection name list as information representing devices whose pieces of connection information have already been stored in the MFP 300. However, this information may include pieces of information of various data formats such as the table format.

In the above embodiment, the mobile communication terminal apparatus 200 receives the connection name list 1400 from the MFP 300, and determines whether information corresponding to the mobile communication terminal apparatus 200 exists in the received connection name list 1400. And if the information corresponding to the communication terminal apparatus 200 exists in the received connection name list 1400, it is regarded that the connection information of the communication terminal apparatus 200 has already been stored in the MFP 300. In that case, the communication terminal apparatus 200 does not transmit the connection information to the MFP 300 but transmits the connection name 1401 to the MFP 300.

However, it is not limited to that the mobile communication terminal apparatus 200 receives the connection name list 1400. Instead of that, for example, the mobile communication terminal apparatus 200 may transmit the connection name with job data to the MFP 300 by the NFC. And the MFP 300 determines whether there exists the connection information corresponding to the received connection name in the MFP 300. If it is determined that there exists the connection information in the MFP 300, the MFP 300 performs handover to the mobile communication terminal apparatus 200 by using the connection information. On the other hand, if it is determined that there does not exist the connection information in the MFP 300, the MFP 300 requests the connection information to the mobile communication terminal apparatus 200 by the NFC. In that case, the mobile communication terminal apparatus 200 transmits the connection information to the MFP 300 by the NFC in response to the request from the MFP 300.

Accordingly, if a plurality of connection names exist in the connection name list 1400, the mobile communication terminal apparatus 200 does not need to acquire the connection name list 1400 or to transmit the connection information when the MFP performs handover by using the connection information that has already stored in the MFP 300.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2013-137486, filed Jun. 28, 2013, which is hereby incorporated by reference herein in its entirety.

What is claimed is:

1. A communication system comprising:
  an information processing apparatus which is able to execute wireless communication by a first wireless communication method and a second wireless communication method and comprises a storage unit configured to store communication information for communication with a device by the second wireless communication method; and
  a communication device capable of wireless communication with said information processing apparatus by the first wireless communication method and the second wireless communication method, wherein said communication device acquires, from said information processing apparatus by the first wireless communication method, determination information for determining whether said storage unit of said information processing apparatus has stored the communication information for communication between said communication device and said information processing apparatus by the second wireless communication method, and wherein, in a case where said communication device determines based on the acquired determination information that said storage unit has not stored the communication information said communication device transmits the communication information to said information processing apparatus by the first wireless communication method, and in a case where said communication device determines based on the acquired determination information that said storage unit has stored the communication information, said communication device, does not transmit the communication information to said information processing apparatus, and as the device, transmits an instruction for executing wireless communication with said communication device by the second wireless communication method using the communication information which has been stored in said storage unit, to said information processing apparatus.

2. The system according to claim 1,
wherein the determination information includes information of the device and the communication information of the device which has been stored in said storage unit of said information processing apparatus, and
in a case where the information of the device indicates said communication device, said communication device determines that said storage unit has stored the communication information for communication between said communication device and said information processing apparatus by the second wireless communication method.

3. The system according to claim 2,
wherein in a case where the information of the device does not indicate said communication device, said communication device determines that said storage unit has not stored the communication information for communication between said communication device and said information processing apparatus by the second wireless communication method.

4. The system according to claim 1, wherein
said communication device:
generates a job, and
determines whether the job requires changing from the first wireless communication method to the second wireless communication method, and
in a case where said communication device determines that the job requires changing from the first wireless communication method to the second wireless communication method, said communication device acquires the determination information from said information processing apparatus.

5. The system according to claim 1, wherein said information processing apparatus stores the transmitted communication information in a memory of a wireless communication unit for communication by the first wireless communication method, and then stores the communication information stored in the memory, in said storage unit.

6. The system according to claim 5, wherein said information processing apparatus adds the communication information stored in the memory to the communication information which has been stored in said storage unit and updates the determination information.

7. The system according to claim 5, wherein said information processing apparatus adds, to said storage unit, the communication information stored in the memory, and then deletes the communication information stored in the memory.

8. The system according to claim 1, wherein the instruction transmitted by said communication device includes identification information for identifying said communication device.

9. The system according to claim 8, wherein
said information processing apparatus stores the communication information and apparatus information in association with each other, and
executes wireless communication using the communication information for communication with said communication device by the second wireless communication method identified by the identification information included in the instruction.

10. The system according to claim 9, wherein the apparatus information stored in said information processing apparatus is designated by a user.

11. The system according to claim 1, wherein the first wireless communication method includes near field wireless communication, and the second wireless communication method includes wireless communication of a wider communicable range than the first wireless communication method.

12. The system according to claim 11, wherein
said information processing apparatus further includes a communication interface configured to perform the near field wireless communication, and
a memory is connected to said communication interface.

13. The system according to claim 1, wherein the communication information includes authentication information used in wireless communication.

14. The system according to claim 1,
said information processing apparatus determines, in a case where the instruction is transmitted from said communication device, whether the communication information of the communication device is stored in said storage unit based on the instruction;
and executes wireless communication using the communication information, based on the determination.

15. The system according to claim 1, wherein the information processing apparatus is a printer.

16. The system according to claim 1, wherein communication device is a mobile terminal device.

17. A communication device capable of wireless communication, by a first wireless communication method and a second wireless communication method, with an information processing apparatus which comprises a storage unit configured to store communication information for communication with a device by the second wireless communication method, comprising:
an acquisition unit configured to acquire, from said information processing apparatus by the first wireless communication method, determination information for determining whether said storage unit of said information processing apparatus has stored the communication information for communication between said communication device and said information processing apparatus by the second wireless communication method, and
a transmission control unit configured to transmit, in a case where said communication device determines based on the acquired determination information that said storage unit has not stored the communication information, the communication information to said information processing apparatus by the first wireless communication method, and to transmit, in a case where said communication device determines based on the acquired determination information that said storage unit has stored the communication information, an instruction for executing wireless communication with said communication device by a second wireless communication method using the communication information which has been stored in said storage unit, to said information processing apparatus, wherein said transmission control unit does not transmit the communication information to said information processing apparatus in a case where said communication device determines that said storage unit has stored the communication information.

18. A control method to be executed in a communication device capable of wireless communication, by a first wireless communication method and a second wireless communication method, with an information processing apparatus which comprises a storage unit configured to store communication information for communication with a device by the second wireless communication method, comprising:

an acquisition step of acquiring, from said information processing apparatus by the first wireless communication method, determination information for determining whether said storage unit of said information processing apparatus has stored the communication information for communication between said communication device and said information processing apparatus by the second wireless communication method, and a transmission control step of transmitting, in a case where said communication device determines based on the acquired determination information said communication device determines based on, the communication information to said information processing apparatus by the first wireless communication method, and to transmit, in a case where said communication device determines based on the acquired determination information that said storage unit has stored the communication information, instruction for executing wireless communication with said communication device by a second wireless communication method using the communication which has been information stored in said storage unit, to said information processing apparatus, wherein said transmission control step does not transmit the communication information to said information processing apparatus in a case where said communication device determines that said storage unit has stored the communication information.

19. A non-transitory computer-readable storage medium storing a program configured to cause a computer to execute the processing method to be executed in a communication device capable of wireless communication, by a first wireless communication method and a second wireless communication method, with an information processing apparatus which comprises a storage unit configured to store communication information for communication with a device by the second wireless communication method, comprising:

an acquisition step of acquiring, from said information processing apparatus by the first wireless communication method, determination information for determining whether said storage unit of said information processing apparatus has stored the communication information for communication between said communication device and said information processing apparatus by the second wireless communication method, and a transmission control step of transmitting, in a case where said communication device determines based on the acquired determination information said communication device determines based on, the communication information to said information processing apparatus by the first wireless communication method, and to transmit, in a case where said communication device determines based on the acquired determination information that said storage unit has stored the communication information, instruction for executing wireless communication with said communication device by a second wireless communication method using the communication which has been information stored in said storage unit, to said information processing apparatus, wherein said transmission control step does not transmit the communication information to said information processing apparatus in a case where said communication device determines that said storage unit has stored the communication information.

20. The system according to claim 1, wherein, in a case where the communication information is transmitted from said communication device, said information processing apparatus executes wireless communication by the second wireless communication method using the transmitted communication information, and in a case where the instruction is transmitted from said communication device, said information processing apparatus executes wireless communication by the second wireless communication method using the communication information stored in said storage unit.

* * * * *